United States Patent
Park

(10) Patent No.: US 10,958,325 B1
(45) Date of Patent: Mar. 23, 2021

(54) METHOD AND APPARATUS FOR SELECTING ANTENNA FOR BEAM MEASUREMENT

(71) Applicant: LG ELECTRONICS INC., Seoul (KR)

(72) Inventor: Ki Wan Park, Yongin-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/740,136

(22) Filed: Jan. 10, 2020

(30) Foreign Application Priority Data

Oct. 18, 2019 (KR) .......................... 10-2019-0130008

(51) Int. Cl.
*H04B 7/06* (2006.01)
*H04W 72/04* (2009.01)
*H04W 88/02* (2009.01)
*H04B 7/08* (2006.01)

(52) U.S. Cl.
CPC ......... *H04B 7/0617* (2013.01); *H04B 7/0695* (2013.01); *H04B 7/088* (2013.01); *H04W 72/046* (2013.01); *H04W 72/048* (2013.01); *H04W 88/02* (2013.01)

(58) Field of Classification Search
CPC .. H04B 7/0566; H04B 7/0617; H04B 7/0619; H04B 7/0671; H04B 7/0695; H04B 7/088; H04W 72/046; H04W 72/048; H04W 88/02
See application file for complete search history.

(56) References Cited

U.S. PATENT DOCUMENTS

| 8,457,026 | B1* | 6/2013 | Ho .................... | H04B 7/0617 370/310 |
| 2017/0212244 | A1* | 7/2017 | Park ................. | H04B 7/086 |
| 2020/0007216 | A1* | 1/2020 | Nasiri Khormuji | H04B 7/0632 |
| 2020/0100290 | A1* | 3/2020 | Mundarath ....... | H04W 16/28 |

FOREIGN PATENT DOCUMENTS

| KR | 10-2015-0067212 A | 6/2015 |
| KR | 10-2018-0049762 A | 5/2018 |

* cited by examiner

*Primary Examiner* — Thanh C Le
(74) *Attorney, Agent, or Firm* — Birch, Stewart, Kolasch & Birch, LLP

(57) ABSTRACT

Disclosed herein is a method and apparatus for selecting an antenna for beam measurement in which a terminal and a base station can communicate with each other in a 5th generation (5G) communication environment by executing an embedded artificial intelligence (AI) algorithm and/or a machine learning algorithm to perform signal processing. The method for selecting an antenna according to an embodiment of the present disclosure can include transmitting, to a base station, a report indicating that an antenna selection function for beam measurement is provided, receiving resource allocation information for beam measurement corresponding to the report from the base station, and performing, in response to a change in a beam direction caused by rotation of a terminal, beam tracking, based on commencement of a beam measurement period included in the resource allocation information for beam measurement.

20 Claims, 8 Drawing Sheets

100 - terminal
200 - base station

100 - terminal
160 - second processor
170a - first antenna
170b - second antenna
170c - third antenna
170d - fourth antenna
170e - fifth antenna
170f - sixth antenna
170g - seventh antenna
170h - eighth antenna 100 - terminal
160a - second-first processor
160b - second-second processor
160c - second-third processor
160d - second-fourth processor
170a - first antenna
170b - second antenna
170c - third antenna
170d - fourth antenna
170e - fifth antenna
170f - sixth antenna
170g - seventh antenna
170h - eighth antenna 100 - terminal
200 - base station
160 - second processor
170a - first antenna
170b - second antenna
170c - third antenna
170d - fourth antenna
170e - fifth antenna
170f - sixth antenna
170g - seventh antenna
170h - eighth antenna

METHOD AND APPARATUS FOR SELECTING ANTENNA FOR BEAM MEASUREMENT

CROSS-REFERENCE TO RELATED APPLICATION

This present application claims benefit of priority to Korean Patent Application No. 10-2019-0130008, entitled "Method and apparatus for selecting antenna for beam measurement" and filed on Oct. 18, 2019, in the Korean Intellectual Property Office, the entire disclosure of which is incorporated herein by reference into the present application.

BACKGROUND

1. Technical Field

The present disclosure relates to a method and apparatus for selecting an antenna for beam measurement. More particularly, the present disclosure relates to a method and apparatus for selecting an antenna for beam measurement that stably maintains beam pairing by minimizing use of a frequency resource and a time resource during beam tracking so as to allow a terminal to communicate with a base station in a millimeter wave environment.

2. Description of Related Art

A 5th generation (5G) mobile communication system is required to not only support a data rate of up to 20 Gbps for a terminal, but also must be able to maintain a data rate of 100 Mbps to 1 Gbps even when the terminal is in any location in a cell. In addition, the 5G mobile communication system is required to support, for example, latency within 1 ms and simultaneous access to a large number of terminals. In order to achieve such technical objectives, the adoption of a millimeter wave band to a mobile communication system has been in the spotlight in recent times.

Korean Patent Application Publication No. 10-2015-0067212 (hereinafter referred to as "Related Art 1") discloses a receiver of a communication system including a synchronization module and a channel estimator. The synchronization module is configured to identify, using slope detection, an end of a cyclic prefix (CP) in a received signal by monitoring a detection metric threshold in the received signal. The channel estimator is configured to estimate a complex noise variance by using guard band subcarriers.

Korean Patent Application Publication No. 10-2018-0049762 (hereinafter referred to as "Related Art 2") discloses a structure of a signal and a channel, and an operation method and apparatus for supporting initial access for a system capable of expecting remarkable increase(s) in communication capacity by using beamforming on a wide frequency band in next generation communication supporting a millimeter wave band.

Using the millimeter wave band can cause greater path loss and serious attenuation due to atmosphere, water vapor, topography, and planimetric features, as compared to using a cellular frequency according to the related art. However, since the number of antennas per unit area can be increased with a short wavelength, a shortcoming related to the path loss can be partially overcome by applying a beam pairing technology with a plurality of antennas. As a result, the millimeter wave band, which is underutilized to build a next generation cellular network aiming to support a data rate 1000 times higher than that of a network according to the related art, has been considered to be used as a candidate frequency band.

Recently announced results of analyzing a channel in the millimeter wave band show that a propagation distance is greater than or equal to 1 km in a line-of-sight region, but is within 200 m in a non-line-of-sight region. Accordingly, the millimeter wave band can be used for a wireless backhaul link in an environment that secures the line-of-sight region, or can be used for a small cell with a coverage of 200 m or less.

As described above, the possibility of utilizing the millimeter wave band has been growing. However, when a base station and a terminal each perform transmission and reception using a directional antenna in the millimeter wave band, a lot of time resources and frequency resources are consumed for beam pairing when a transmitter and a receiver are not coincident with each other in terms of a directivity.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

RELATED ART DOCUMENTS

Related Art 1: Korean Patent Application Publication No. 10-2015-0067212 (published on Jun. 17, 2015)
Related Art 2: Korean Patent Application Publication No. 10-2018-0049762 (published on May 11, 2018)

SUMMARY OF THE INVENTION

The present disclosure is directed to stably maintaining beam pairing between a base station and a terminal in a millimeter wave environment.

The present disclosure is further directed to minimizing use of a frequency resource and a time resource when the terminal performs beam tracking so as to communicate with the base station in the millimeter wave environment.

The present disclosure is still further directed to minimizing an occurrence of beam failure of the terminal when the terminal performs beam tracking so as to communicate with the base station in the millimeter wave environment.

The present disclosure is still further directed to reducing power consumption of the terminal when the terminal performs beam tracking so as to communicate with the base station in the millimeter wave environment.

A method for selecting an antenna for beam measurement according to an embodiment of the present disclosure can include stably maintaining beam pairing by minimizing use of a frequency resource and a time resource during beam tracking so as to allow a terminal to communicate with a base station in a millimeter wave environment.

Specifically, the method for selecting an antenna for beam measurement according to this embodiment of the present disclosure can include transmitting, to a base station, a report indicating that an antenna selection function for beam measurement is provided; receiving resource allocation information for beam measurement corresponding to the report from the base station; and performing, in response to a change in a beam direction caused by rotation of a terminal, beam tracking for selecting an antenna in a location where the beam direction is changed from an antenna at a previous location so as to maintain optimal beam pairing among a plurality of beams formed by the base station and a plurality of beams formed by the terminal based on commencement of a beam measurement period included in the resource allocation information for beam measurement.

Through the method for selecting an antenna for beam measurement according to this embodiment of the present disclosure, resources required by the terminal when the terminal performs beam tracking so as to communicate with the base station in a millimeter wave environment can be minimized, thereby being capable of reducing occupancies of a frequency resource and a time resource.

In addition, the receiving the resource allocation information for beam measurement can include extracting beam measurement scheduling information from the resource allocation information for beam measurement corresponding to the report and extracting a beam measurement period included in the beam measurement scheduling information. The beam measurement period can be slower than a beam measurement period included in resource allocation information for beam measurement received by a terminal that has not transmitted the report.

In addition, the performing the beam tracking can include identifying an initial location of one antenna that forms optimal beam pairing with the base station among a plurality of antennas, obtaining a rotation angle of the terminal calculated by using a result of sensing a rotation degree from a position of the terminal, calculating a changed beam direction in response to the rotation angle of the terminal, and selecting an antenna in a location corresponding to the changed beam direction.

In addition, the performing the beam tracking can include performing the beam tracking based on identification of a change of the beam measurement period included in the resource allocation information for beam measurement.

In addition, the method for selecting an antenna for beam measurement according to this embodiment of the present disclosure can further include sensing a speed of the terminal separately from the beam measurement period included in the resource allocation information for beam measurement, transmitting a resource allocation information request signal for additional beam measurement to the base station based on the speed of the terminal that is greater than or equal to a preset speed, and receiving the resource allocation information for additional beam measurement from the base station.

In addition, the receiving the resource allocation information for additional beam measurement can include receiving the resource allocation information for additional beam measurement including an additional beam measurement period that is faster than the beam measurement period included in the resource allocation information for beam measurement.

In addition, the method for selecting an antenna for beam measurement according to this embodiment of the present disclosure can further include performing beam tracking for selecting an antenna, in response to the change in the beam direction corresponding to the rotation of the terminal, based on commencement of the additional beam measurement period included in the resource allocation information for additional beam measurement.

In addition, the method for selecting an antenna for beam measurement according to this embodiment of the present disclosure can further include receiving, from the base station, a measurement result that a distance between the terminal and the base station is less than or equal to a preset distance, separately from the beam measurement period included in the resource allocation information for beam measurement; transmitting a resource allocation information request signal for additional beam measurement to the base station; and receiving the resource allocation information for additional beam measurement from the base station.

In addition, the receiving the resource allocation information for additional beam measurement can include receiving the resource allocation information for additional beam measurement including an additional beam measurement period that is faster than the beam measurement period included in the resource allocation information for beam measurement.

In addition, the method for selecting an antenna for beam measurement according to this embodiment of the present disclosure can further include performing beam tracking for selecting an antenna in response to the change in the beam direction corresponding to the rotation of the terminal based on commencement of the additional beam measurement period included in the resource allocation information for additional beam measurement.

An apparatus for selecting an antenna for beam measurement according to another embodiment of the present disclosure can include a plurality of antennas and a communication processor configured to control communication with a base station. The communication processor can be configured to transmit, to a base station, a report indicating that an antenna selection function for beam measurement is provided; receive resource allocation information for beam measurement corresponding to the report from the base station; and perform, in response to a change in a beam direction caused by rotation of a terminal, beam tracking for selecting an antenna in a location where the beam direction is changed from an antenna at a previous location so as to maintain optimal beam pairing among a plurality of beams formed by the base station and a plurality of beams formed by the terminal based on commencement of a beam measurement period included in the resource allocation information for beam measurement.

Through the apparatus for selecting an antenna for beam measurement according to this embodiment of the present disclosure, resources required by the terminal when the terminal performs beam tracking so as to communicate with the base station in a millimeter wave environment can be minimized, thereby being capable of reducing occupancies of a frequency resource and a time resource.

In addition, the communication processor can be configured to extract beam measurement scheduling information from the resource allocation information for beam measurement corresponding to the report and extract a beam measurement period included in the beam measurement scheduling information. The beam measurement period can be slower than a beam measurement period included in resource allocation information for beam measurement received by a terminal that has not transmitted the report.

In addition, the apparatus for selecting an antenna for beam measurement according to this embodiment of the present disclosure can further include a position sensing module configured to sense a rotation degree from a position of the terminal and a module control processor configured to calculate a rotation angle of the terminal using the rotation degree of the terminal. The communication processor can be configured to identify an initial location of one antenna that forms optimal beam pairing with the base station, obtain the rotation angle of the terminal from the module control processor, calculate a changed beam direction in response to the rotation angle of the terminal, and select an antenna in a location corresponding to the changed beam direction.

In addition, the communication processor can be configured to perform the beam tracking based on identification of a change of the beam measurement period included in the resource allocation information for beam measurement.

In addition, the apparatus for selecting an antenna for beam measurement according to this embodiment of the present disclosure can further include a speed sensing module configured to sense a speed of the terminal. The communication processor can be configured to obtain the speed of the terminal from the speed sensing module separately from the beam measurement period included in the resource allocation information for beam measurement, transmit a resource allocation information request signal for additional beam measurement to the base station based on the speed of the terminal that is greater than or equal to a preset speed, and receive resource allocation information for additional beam measurement from the base station.

In addition, the communication processor can be configured to receive the resource allocation information for additional beam measurement including an additional beam measurement period that is faster than the beam measurement period included in the resource allocation information for beam measurement.

In addition, the communication processor can be configured to perform beam tracking for selecting an antenna in response to the change in the beam direction corresponding to the rotation of the terminal based on commencement of the additional beam measurement period included in the resource allocation information for additional beam measurement.

In addition, the communication processor can be configured to receive, from the base station, a measurement result that a distance between the terminal and the base station is less than or equal to a preset distance, separately from the beam measurement period included in the resource allocation information for beam measurement; transmit a resource allocation information request signal for additional beam measurement to the base station; and receive the resource allocation information for additional beam measurement from the base station.

In addition, the communication processor can be configured to receive the resource allocation information for additional beam measurement including an additional beam measurement period that is faster than the beam measurement period included in the resource allocation information for beam measurement.

In addition, the communication processor can be configured to perform beam tracking for selecting an antenna, in response to the change in the beam direction corresponding to the rotation of the terminal, based on commencement of the additional beam measurement period included in the resource allocation information for additional beam measurement.

In addition to these embodiments, another method and system for implementing the present disclosure, and a computer-readable recording medium storing a computer program for executing the method can be further provided.

Other aspects and features as well as those described above will become clear from the accompanying drawings, the claims, and the detailed description of the present disclosure.

According to the present disclosure, when a terminal performs beam tracking so as to communicate with a base station in a millimeter wave environment, an occurrence of beam failure of the terminal can be minimized.

In addition, when the terminal performs beam tracking so as to communicate with the base station in the millimeter wave environment, resources required by the terminal can be minimized, thereby being capable of reducing occupancies of a frequency resource and a time resource.

In addition, when the terminal performs beam tracking so as to communicate with the base station in the millimeter wave environment, power consumption of the terminal can be reduced.

The effects of the present disclosure are not limited to those mentioned above, and other effects not mentioned can be clearly understood by those skilled in the art from the following description.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an embodiment, it being understood, however, that the present disclosure is not intended to be limited to the details shown because various modifications and structural changes can be made therein without departing from the spirit of the present disclosure and within the scope and range of equivalents of the claims. The use of the same reference numerals or symbols in different drawings indicates similar or identical items.

DETAILED DESCRIPTION

Figure 1:
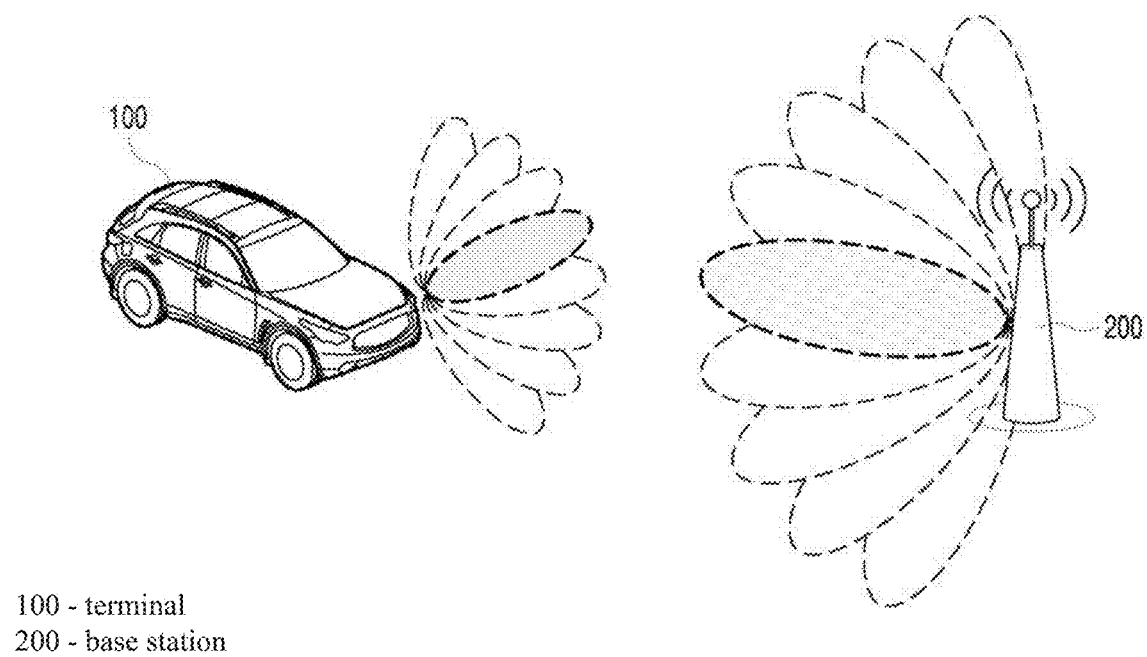
FIG. 1 is a diagram illustrating a wireless communication environment including a terminal and a base station according to an embodiment of the present disclosure.

The advantages and features of the present disclosure and methods to achieve them will be apparent from the embodiments described below in detail in conjunction with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular embodiments only and is not intended to be limiting. As used herein, the articles "a," "an," and "the," include plural referents unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, terms such as "first," "second," and other numerical terms can be used herein only to describe various elements, but these elements should not be limited by these terms. These terms are only used to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is a diagram illustrating a wireless communication environment including a terminal 100 and a base station 200 according to an embodiment of the present disclosure. Referring to FIG. 1, the wireless communication environment can include the terminal 100 and the base station 200.

The base station 200 can denote a terminal node of a network that directly communicates with the terminal 100. In embodiments of the present disclosure, a specific operation, described as being performed by the base station 200, can be performed by an upper node of the base station 200, according to circumstances. That is, it is obvious that various operations, performed for communication with the terminal 100 in a network including a plurality of network nodes including the base station 200, can be performed by the base station 200 or network nodes other than the base station 200. The base station 200 can be replaced by a term such as a fixed station, a Node B, an evolved-NodeB (eNB), a base transceiver system (BTS), an access point (AP), or a general NB (gNB). In addition, the terminal 100 can be fixed or can have mobility, and can be replaced by a term such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, or a device-to-device (D2D) device.

Hereinafter, downlink (DL) can denote communication from the base station 200 to the terminal 100. In addition, uplink (UL) can denote communication from the terminal 100 to the base station 200. In the DL, a transmitter can be part of the base station 200, and the receiver can be part of the terminal 100. In the UL, a transmitter can be part of the terminal 100, and a receiver can be part of the base station 200.

The following technologies can be used in a variety of wireless access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA can be implemented using a radio technology, such as universal terrestrial radio access (UTRA) or CDMA2000. The TDMA can be implemented using a radio technology, such as a global system for mobile communications (GSM)/general packet radio service (GPRS)/enhanced data rates for GSM evolution (EDGE). The OFDMA can be implemented using a radio technology, such as an institute of electrical and electronics engineers (IEEE) 802.11 (Wi-Fi), IEEE 802.16 (WiMAX), IEEE 802.20, or evolved UTRA (E-UTRA). The UTRA can be part of a universal mobile telecommunications system (UMTS). 3rd generation partnership project (3GPP) long term evolution (LTE), which is part of an evolved UMTS (E-UMTS) using evolved UMTS terrestrial radio access (E-UTRA), can adopt the OFDMA in the DL and adopt the SC-FDMA in the UL. LTE-advanced (LTE-A) is the evolution of the 3GPP LTE.

5G NR (new radio) can define enhanced mobile broadband (eMBB), massive machine type communications (mMTC), ultra-reliable low latency communications (URLLC), and vehicle-to-everything (V2X) according to a usage scenario. A 5G NR standard can be classified into standalone (SA) and non-standalone (NSA) according to co-existence between an NR system and an LTE system. In addition, the 5G NR can support various subcarrier spacings, and can support the CP-OFDM in the downlink and the CP-OFDM and DFT-s-OFDM (SC-OFDM) in the uplink.

Figure 3A:
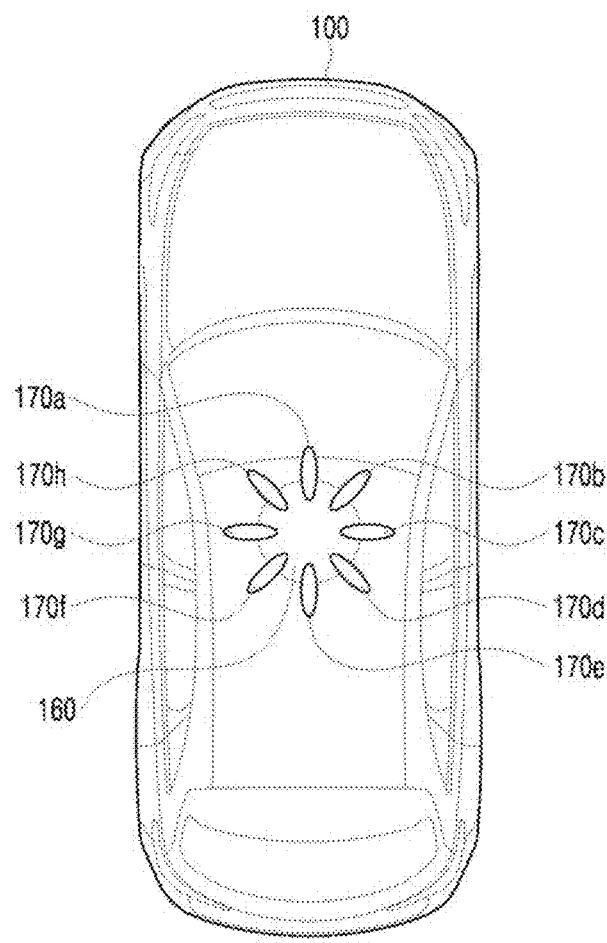
FIGS. 3A and 3B are diagrams illustrating arrangements of an antenna and a second processor provided in the terminal of FIG. 2.
Figure 3B:
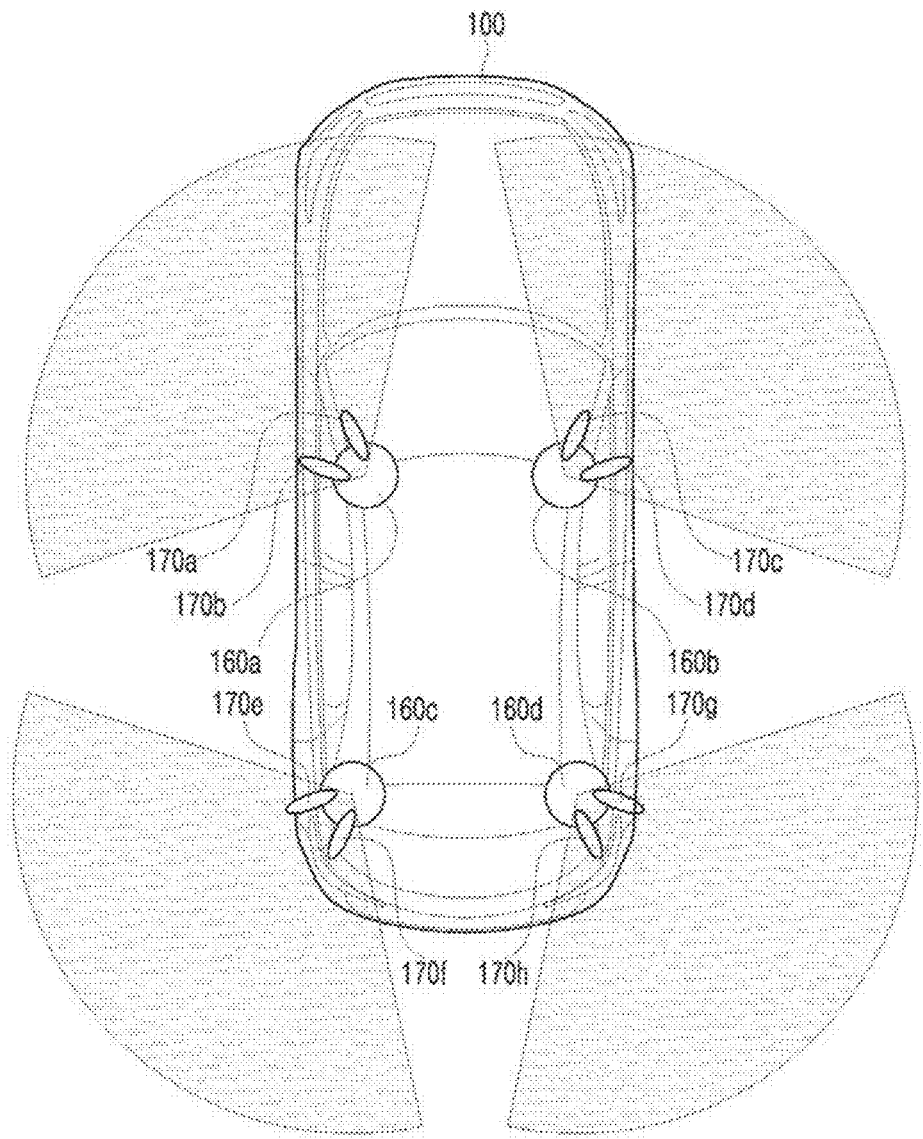

In embodiments of the present disclosure, the terminal 100 can include an automobile, and can include an antenna 170 including a first antenna 170a to an eighth antenna 170h, as illustrated in FIGS. 3A and 3B. In embodiments of the present disclosure, the terminal 100 can transmit, to the base station 200, a report indicating that a function capable of selecting one antenna 170 among the first antenna 170a to the eighth antenna 170h is provided for beam measurement.

The base station 200 can transmit resource allocation information for beam measurement to the terminal 100 in response to the received report, and the terminal 100 can receive the resource allocation information for beam measurement. Here, the resource allocation information for beam measurement can include a channel state information-reference signal (CSI-RS). Since the CSI-RS is a known technology, a detailed description thereof will be omitted. The resource allocation information for beam measurement transmitted from the base station 200 to the terminal 100 can include beam measurement scheduling information, and the beam measurement scheduling information can include a beam measurement period.

In embodiments of the present disclosure, the beam measurement period included in the resource allocation information for beam measurement received by the terminal 100 that has transmitted the report can be slower than a beam measurement period included in resource allocation information for beam measurement received by a terminal (not illustrated) that has not transmitted the report. For example, when the beam measurement period included in the resource allocation information for beam measurement received by the terminal that has not transmitted the report is once every second, the beam measurement period included in the resource allocation information for beam measurement received by the terminal 100 that has transmitted the report can be once every two seconds or once every three seconds. When the beam measurement period is short, consumption of a time resource and a frequency resource can increase since the terminal needs to perform frequent beam measurement, and power consumption can increase since the terminal needs to frequently receive the resource allocation information for beam measurement. However, in embodiments of the present disclosure, since the beam measurement period is long, the consumption of the time resource and the frequency resource and the power consumption can be reduced as compared to a case where the beam measurement period is short.

The terminal 100 can perform, in response to a change in a beam direction caused by rotation of the terminal 100, beam tracking for selecting an antenna (one of the first antenna 170*a* to the eighth antenna 170*h*) in a location where the beam direction is changed from an antenna (the other one of the first antenna 170*a* to the eighth antenna 170*h*) in a previous location so as to maintain optimal beam pairing among a plurality of beams formed by the base station 200 and a plurality of beams formed by the terminal 100 based on commencement of the beam measurement period included in the resource allocation information for beam measurement.

In the case of a terminal that does not have an antenna selection function, that is, a terminal that has not transmitted the report to the base station 200, a beam failure can occur when the terminal rotates. Accordingly, the terminal can request a resource allocation information request signal for additional beam measurement to the base station 200, and can perform beam tracking using an additional beam measurement period included in resource allocation information for additional beam measurement received from the base station 200.

However, in embodiments of the present disclosure, when the terminal 100 rotates, the antenna 170, in a location where the beam direction is changed from the antenna at a previous location, can be selected in response to the change in the beam direction caused by the rotation of the terminal 100, thereby being capable of maintaining beam paring between the terminal 100 and the base station 200. Thus, the terminal 100 does not need to transmit the resource allocation information request signal for additional beam measurement to the base station 200.

In embodiments of the present disclosure, there can be cases where the beam measurement period included in the resource allocation information for beam measurement received by the terminal 100 that has transmitted the report is not slow as described above, but is faster. First, there is a case where a speed of the terminal 100, measured by the terminal 100 itself, is greater than or equal to a preset speed (for example, 60 km/h). Second, there is a case where a distance between the terminal 100 and the base station 200 measured by the base station 200 is less than or equal to a preset distance (for example, 100 km).

When the speed of the terminal 100, measured by the terminal 100 itself, is greater than or equal to the preset speed, the terminal 100 can transmit a resource allocation information request signal for additional beam measurement to the base station 200. The terminal 100 can check its speed regardless of the beam measurement period. Upon receiving the resource allocation information request signal for additional beam measurement, the base station 200 can transmit resource allocation information for additional beam measurement including a shorter additional beam measurement period to the terminal 100. Upon receiving the resource allocation information for additional beam measurement, the terminal 100 can perform beam measurement based on commencement of the additional beam measurement period.

When the distance between the terminal 100 and the base station 200 measured by the base station 200 is less than or equal to the preset distance, the base station 200 can transmit a distance measurement result signal indicating that the distance between the terminal 100 and the base station 200 is less than or equal to the preset distance to the terminal 100. Upon receiving the distance measurement result signal from the base station 200, the terminal 100 can transmit a resource allocation information request signal for additional beam measurement to the base station 200. Upon receiving the resource allocation information request signal for additional beam measurement, the base station 200 can transmit the resource allocation information for additional beam measurement including the shorter additional beam measurement period to the terminal 100. Upon receiving the resource allocation information for additional beam measurement, the terminal 100 can perform beam measurement based on the commencement of the additional beam measurement period.

Figure 2:
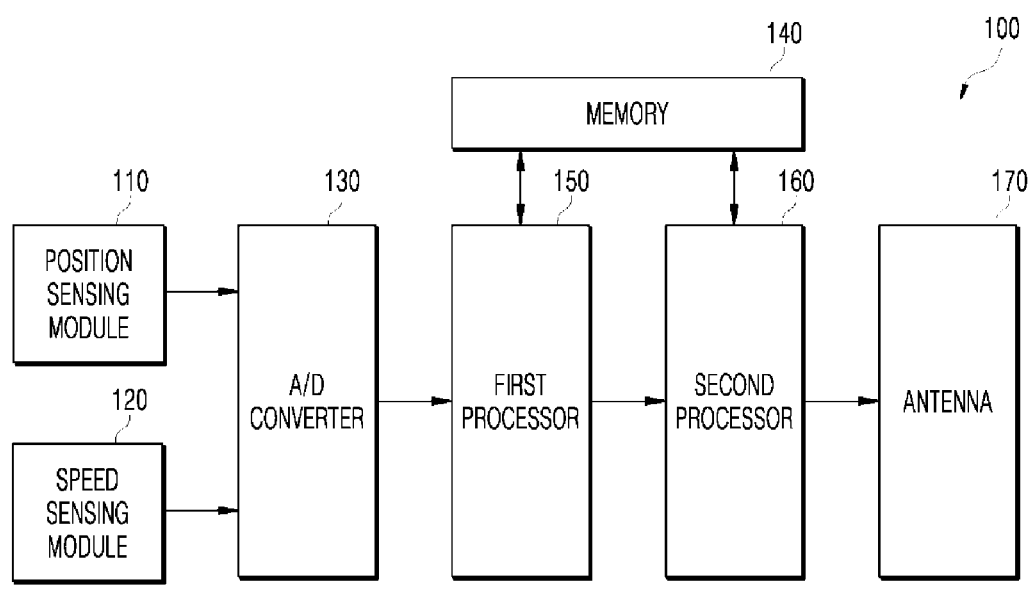
FIG. 2 is a schematic block diagram illustrating a terminal that performs antenna selection for beam measurement according to an embodiment of the present disclosure.

FIG. 2 is a schematic block diagram illustrating a terminal that performs antenna selection for beam measurement according to an embodiment of the present disclosure. In the following description, descriptions of parts that are the same as those in FIG. 1 will be omitted. Referring to FIG. 2, the terminal 100 can include a position sensing module 110, a speed sensing module 120, an analog/digital (A/D) converter 130, a memory 140, a first processor 150, a second processor 160, and the antenna 170.

The position sensing module 110 can sense a position of the terminal 100 and sense a rotation degree of the terminal 100 from the position of the terminal 100. The position sensing module 110 can include at least one sensor (not illustrated) capable of sensing a change in at least one among a pitch-axis, a yaw-axis, or a roll-axis. The position sensing module 110 can sense a yaw rate of the terminal 100 to sense the rotation degree of the terminal 100. The position sensing module 110 can include, for example, a gyro sensor or an acceleration sensor that senses a position change. In addition, the position sensing module 110 can sense a moving direction of the terminal 100. The position sensing module 110 can include a yaw-axis sensor. For example, among an x-axis which is the moving direction of the terminal 100, a y-axis which is the left side of the moving direction of the terminal 100, and a z-axis which is perpendicular to the x-axis and the y-axis, the yaw-axis sensor can determine whether the terminal 100 rotates about the z-axis.

In an optional embodiment, the position sensing module 110 can include a steering sensor (not illustrated) to sense the rotation degree of the terminal 100. The steering sensor provided in a steering wheel of the terminal 100 can sense the rotation degree of the terminal 100 by detecting an amount of rotation of a steering wheel of a vehicle. In an optional embodiment, the position sensing module 110 can include a steering angle sensor (not illustrated) to sense the rotation degree of the terminal 100. The steering angle sensor can sense the rotation degree of the terminal 100 by detecting a variable angle of a steering wheel operated by a driver, that is, a steering wheel angle.

The speed sensing module 120 can sense a speed of the terminal 100. The speed sensing module 120 can sense the speed by detecting the number of rotations of a wheel provided in the terminal 100. In addition, the speed sensing module 120 can sense the speed of the terminal 100 by sensing a rotational speed of an output shaft of a transmission connected to an engine of the terminal 100. In addition, the speed sensing module 120 can directly sense the speed of the terminal 100 by using at least one vehicle speed sensor provided in the terminal 100, for example, a reed switch-type vehicle speed sensor, a photoelectric vehicle speed sensor, or an electronic vehicle speed sensor.

The A/D converter 130 can convert an analog rotation degree signal received from the position sensing module 110 into a digital rotation degree signal and output the converted rotation degree signal to the first processor 150. In addition, the A/D converter 130 can convert an analog speed signal received from the speed sensing module 120 into a digital speed signal and output the converted speed signal to the first processor 150.

The memory 140, which stores various types of information necessary for an operation of the terminal 100, can include a volatile or nonvolatile recording medium. For example, the memory 140 can store a report indicating that the terminal 100 has an antenna selection function for beam measurement. In addition, the memory 140 can store resource allocation information for beam measurement received from the base station 200. In addition, the memory 140 can store a rotation degree of the terminal 100 and a speed of the terminal 100 sensed by the position sensing module 110 and the speed sensing module 120. In addition, the memory 140 can store an artificial intelligence learning algorithm for selecting the antenna 170 that allows the terminal 100 to maintain beam pairing with the base station 200 according to the rotation degree of the terminal 100, the speed of the terminal 100, and information about a distance between the terminal 100 and the base station 200 received from the base station 200.

In addition, the memory 140 can store, in response to a change in a beam direction caused by rotation of the terminal 100, a command to perform beam tracking for selecting the antenna 170 in a location where the beam direction is changed from the antenna 170 in a previous location so as to maintain optimal beam pairing among a plurality of beams formed by the base station 200 and a plurality of beams formed by the terminal 100, based on the commencement of a beam measurement period included in the resource allocation information for beam measurement and a command to be executed by the second processor 160, for example, a command to transmit, to the base station 200, a report indicating that an antenna selection function for beam measurement is provided, or a command to receive resource allocation information for beam measurement corresponding to the report from the base station 200.

Here, the memory 140 can include a magnetic storage media or a flash storage media, but the scope of the embodiments of the present disclosure is not limited thereto. The memory 140 can include a built-in memory and/or an external memory, and can include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as a solid state disk (SSD) compact flash (CF) card, an SD card, a Micro-SD card, a Mini-SD card, an XD card, or a memory stick, or a storage device such as an HDD.

The first processor 150, which is a module control processor, can control operations of the position sensing module 110 and the speed sensing module 120. The first processor 150 can calculate a rotation angle of the terminal 100 by using the rotation degree of the terminal 100 sensed by the position sensing module 110 and transmit the calculated rotation angle to the second processor 160. In addition, the first processor 150 can transmit the speed of the terminal 100 sensed by the speed sensing module 120 to the second processor 160.

Here, the "processor" can, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), and a field programmable gate array (FPGA) can be included, but the scope of the present disclosure is not limited thereto.

The second processor 160, which is a communication processor, can transmit, to the base station 200, a report indicating that an antenna selection function for beam measurement is provided.

The second processor 160 can receive resource allocation information for beam measurement corresponding to the report from the base station 200. The second processor 160 can extract beam measurement scheduling information from the resource allocation information for beam measurement corresponding to the report. The second processor 160 can extract a beam measurement period included in the beam measurement scheduling information. Here, the second processor 160 can extract a beam measurement period slower than a beam measurement period included in resource allocation information for beam measurement received by a terminal that has not transmitted the report.

The second processor 160 can perform, in response to a change in a beam direction caused by rotation of the terminal 100, beam tracking for selecting the antenna 170 in a location where the beam direction is changed from the antenna 170 in a previous location, so as to maintain optimal beam pairing among a plurality of beams formed by the base station 200 and a plurality of beams formed by the terminal 100, based on commencement of the beam measurement period included in the resource allocation information for beam measurement.

When the second processor 160 performs beam tracking, the terminal 100 provided with the first antenna 170a to the eighth antenna 170h can identify an initial location of one antenna 170 that forms optimal beam pairing with the base station 200. The second processor 160 can obtain a rotation angle of the terminal 100 from the first processor 150. The second processor 160 can calculate a changed beam direction in response to the rotation angle of the terminal 100. The second processor 160 can select the antenna 170 in a location corresponding to the changed beam direction. The memory 140 can store location information about the antenna 170 provided in the terminal 100, and the second processor 160 can select the antenna 170 corresponding to the changed beam direction. That is, the second processor 160 can change from the antenna 170 in the initial location to the antenna 170 in a location corresponding to the rotation angle of the terminal 100. Here, the terminal 100 and the base station 200 can be in a state of maintaining beam pairing. The second processor 160 can perform beam tracking for every beam measurement period. In addition, when a change of the beam measurement period included in the resource allocation information for beam measurement is identified, the second processor 160 can perform beam tracking.

The second processor 160 can obtain a result of sensing a speed of the terminal 100 from the first processor 150, separately from the beam measurement period included in the resource allocation information for beam measurement. The second processor 160 can transmit a resource allocation information request signal for additional beam measurement to the base station 200 based on the speed of the terminal 100 that is greater than or equal to a preset speed.

The second processor 160 can receive resource allocation information for additional beam measurement from the base station 200. Here, the second processor 160 can receive the resource allocation information for additional beam measurement including an additional beam measurement period that is faster than the beam measurement period included in the resource allocation information for beam measurement. The second processor 160 can perform beam tracking for selecting the antenna 170 in response to the change in the beam direction corresponding to the rotation of the terminal 100 based on commencement of the additional beam measurement period included in the resource allocation information for additional beam measurement.

The second processor 160 can receive, from the base station 200, a measurement result that a distance between the terminal 100 and the base station 200 is less than or equal to a preset distance, separately from the beam measurement period included in the resource allocation information for beam measurement. Upon receiving, from the base station 200, the measurement result that the distance between the terminal 100 and the base station 200 is less than or equal to the preset distance, the second processor 160 can transmit a resource allocation information request signal for additional beam measurement to the base station 200.

The second processor 160 can receive resource allocation information for additional beam measurement from the base station 200. Here, the second processor 160 can receive the resource allocation information for additional beam measurement including an additional beam measurement period that is faster than the beam measurement period included in the resource allocation information for beam measurement. The second processor 160 can perform beam tracking for selecting the antenna 170 in response to the change in the beam direction corresponding to the rotation of the terminal 100 based on commencement of the additional beam measurement period included in the resource allocation information for additional beam measurement.

In an optional embodiment, the second processor 160 can select the antenna 170 that allows the terminal 100 to maintain beam pairing with the base station 220 from a rotation degree, speed information, and distance information of the terminal 100 in a state in which the beam measurement period commences, by using a deep neural network (DNN) model that is pre-trained to select an antenna that allows a terminal to maintain beam pairing with a base station from a rotation degree, speed information, and distance information of the terminal. To this end, the second processor 160 can perform machine learning, such as deep learning, and the memory 140 can store data used for, for example, machine learning and result data.

Deep learning, which is a subfield of machine learning, enables data-based learning through multiple layers. Deep learning can represent a set of machine learning algorithms that extract core data from a plurality of data sets as the number of layers increases.

Deep learning structures can include an artificial neural network (ANN), and can include a convolutional neural network (CNN), a recurrent neural network (RNN), a deep belief network (DBN), and the like. The deep learning structure according to the present embodiment can use various structures well known in the art. For example, the deep learning structure according to the present disclosure can include a CNN, an RNN, a DBN, and the like. An RNN is widely used in natural language processing and can configure an ANN structure by building up layers at each instant in a structure that is effective for processing time-series data which vary with time. A DBN can include a deep learning structure formed by stacking up multiple layers of restricted Boltzmann machines (RBM), which is a deep learning scheme. When a predetermined number of layers are constructed by repetition of RBM learning, the DBN having the predetermined number of layers can be constructed. A CNN can include a model mimicking a human brain function, which is built under the assumption that when a person recognizes an object, the brain extracts the most basic features of the object and recognizes the object based on the result of complex calculations in the brain.

Meanwhile, learning of an ANN can be performed by adjusting a weight of a connection line (also adjusting a bias value, if necessary) between nodes so that a desired output is achieved with regard to a given input. Also, the ANN can continuously update the weight values through learning. Furthermore, methods such as back propagation can be used in training the ANN.

The second processor 160 can be loaded with the ANN, and can perform antenna selection processing based on machine learning by using, as input data, the rotation degree of the terminal 100, the speed of the terminal 100, and information about the distance between the terminal 100 and the base station 200 received from the base station 200.

The controller 160 can include an ANN, such as a DNN including a CNN, an RNN, a DBN, and the like, and can train the DNN. As a machine learning method for an ANN, both unsupervised learning and supervised learning can be used. The second processor 160 can control to update an ANN structure for selecting the antenna 170 after learning according to a setting.

FIGS. 3A and 3B are diagrams illustrating arrangements of an antenna and a second processor provided in the terminal of FIG. 2. In the following description, descriptions of parts that are the same as those in FIG. 1 and FIG. 2 will be omitted.

FIG. 3A illustrates arrangements of an antenna 170 including a circle-shaped first antenna 170a to eighth antenna 170h and a single second processor 160.

FIG. 3B illustrates arrangements of an antenna 170 including a separable first antenna 170a to eighth antenna 170h and a separable second-first processor 160a to second-fourth processor 160d. Specifically, FIG. 3B illustrates an example in which the first antenna 170a, the second antenna 170b, and the second-first processor 160a are provided in an upper left portion of the terminal 100; the third antenna 170c, the fourth antenna 170d, and the second-second processor 160b are provided in an upper right portion of the terminal 100; the fifth antenna 170e, the sixth antenna 170f, and the second-third processor 160c are provided in a lower left portion of the terminal 100; and the seventh antenna 170g, the eighth antenna 170h, and the second-fourth processor 160d are provided in a lower right portion of the terminal 100.

In embodiments of the present disclosure, locations of the first antenna 170a to the eighth antenna 170h and the second processor 160 are not limited to those illustrated in FIGS. 3A and 3B, and various modifications can be made.

Figure 4A:
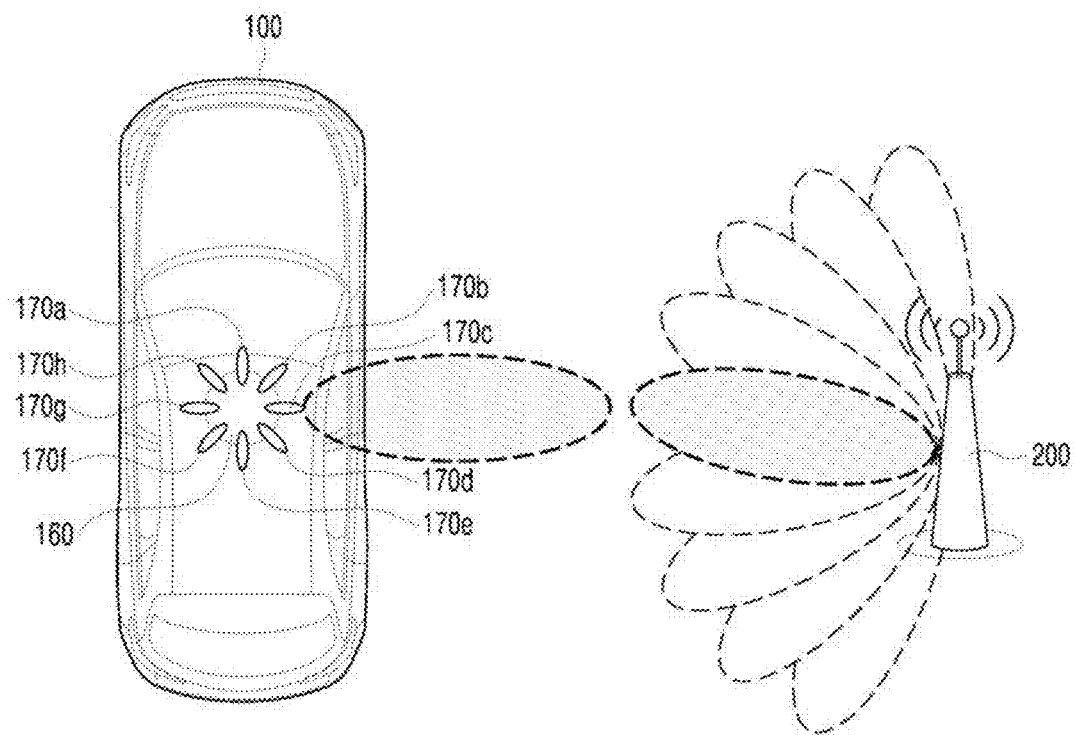
FIGS. 4A and 4B are diagrams illustrating antenna selection for beam measurement performed by a terminal according to an embodiment of the present disclosure.
Figure 4B:
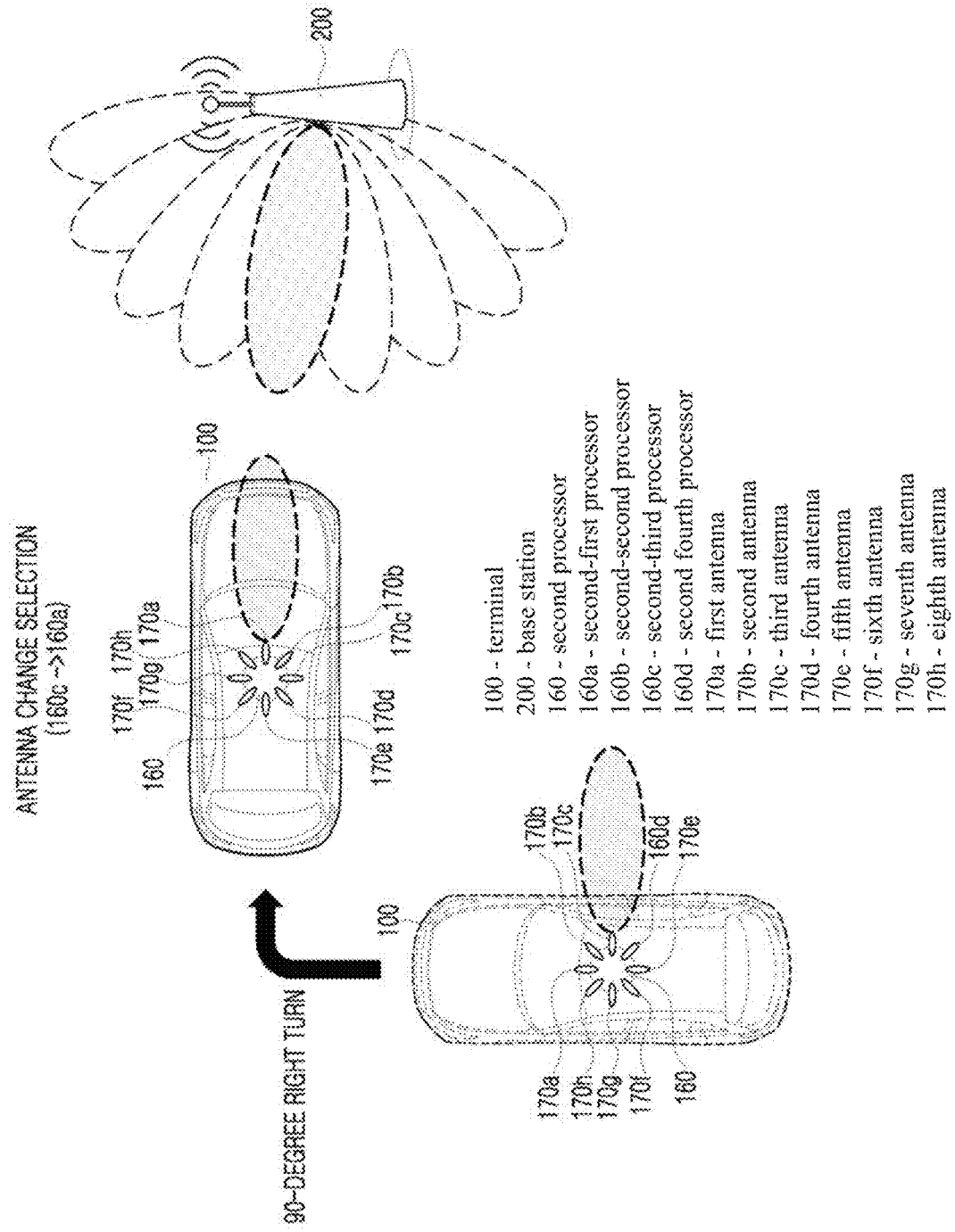

FIGS. 4A and 4B are diagrams illustrating antenna selection for beam measurement performed by a terminal according to an embodiment of the present disclosure. In the following description, descriptions of reference numerals overlapping with those of FIGS. 1 to 3 will be omitted for convenience of description.

FIG. 4A illustrates an initial location of the antenna 170 in which the third antenna 170c, from among the first antenna 170a to the eighth antenna 170h, and the base station 200 form optimal beam pairing.

FIG. 4B illustrates an example in which, after the terminal 100 rotates 90 degrees in FIG. 4A, the first antenna 170a in a location changed from an initial location in response to a rotation angle of the terminal 100 is selected. In FIG. 4B, the terminal 100 and base station 200 can be in a state of still maintaining beam pairing as illustrated in FIG. 4A.

Figure 5:
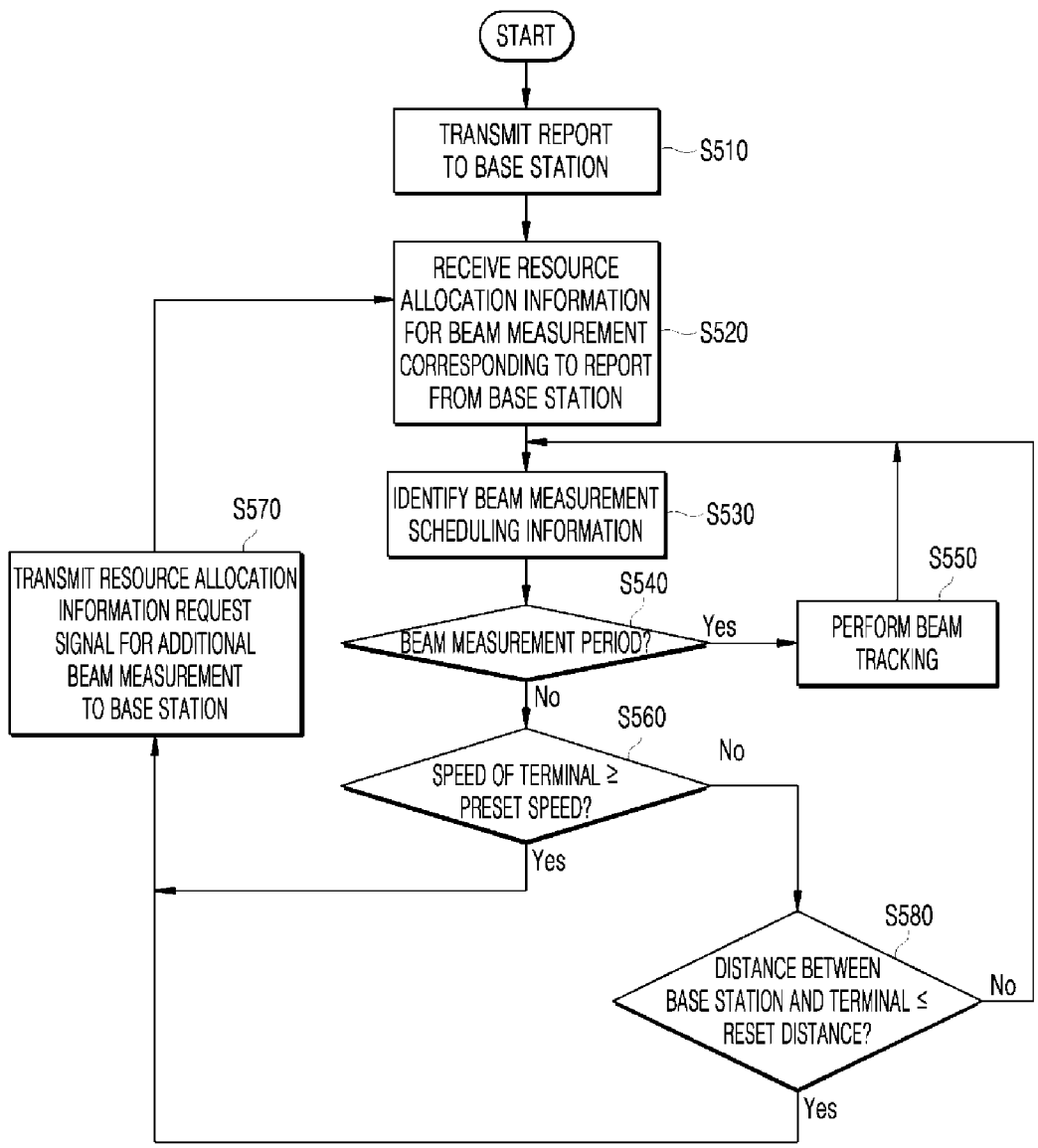
FIG. 5 is a flowchart illustrating a method for selecting an antenna for beam measurement according to an embodiment of the present disclosure.

FIG. 5 is a flowchart illustrating a method for selecting an antenna for beam measurement according to an embodiment of the present disclosure. In the following description, descriptions of reference numerals overlapping with those of FIGS. 1 to 4 will be omitted for convenience of description.

Referring to FIG. 5, in step S510, the terminal 100 can transmit, to the base station 200, a report indicating that an antenna selection function for beam measurement is provided.

In step S520, the terminal 100 can receive resource allocation information for beam measurement corresponding to the report from the base station 200.

In step S530, the terminal 100 can extract beam measurement scheduling information from the resource allocation information for beam measurement corresponding to the report to identify the beam measurement scheduling information. Here, the beam measurement scheduling information can include information about a beam measurement period. In addition, a beam measurement period of the terminal 100 that has transmitted the report can be slower than a beam measurement period of a terminal 100 that has not transmitted the report.

In step S540, the terminal 100 can perform, in response to a change in a beam direction caused by rotation of the terminal 100, beam tracking for selecting the antenna 170 in a location where the beam direction is changed from the antenna 170 in a previous location so as to maintain optimal beam pairing among a plurality of beams formed by the base station 200 and a plurality of beams formed by the terminal 100, based on commencement of the beam measurement period included in the resource allocation information for beam measurement.

In step S560, the terminal 100 can compare a sensing result of a speed of the terminal 100 to a preset speed, separately from the beam measurement period included in the resource allocation information for beam measurement, to determine whether the speed of the terminal 100 is greater than or equal to the preset speed.

In step S570, when the speed of the terminal 100 is greater than or equal to the preset speed, the terminal 100 can transmit a resource allocation information request signal for additional beam measurement to the base station 200.

Thereafter, the terminal 100 can receive resource allocation information for additional beam measurement from the base station 200. Here, the terminal 100 can receive the resource allocation information for additional beam measurement including an additional beam measurement period that is faster than the beam measurement period included in the resource allocation information for beam measurement. The terminal 100 can perform beam tracking for selecting the antenna 170 according to the change in the beam direction corresponding to the rotation of the terminal 100 based on commencement of the additional beam measurement period included in the resource allocation information for additional beam measurement.

In step S580, the terminal 100 can receive information about a distance between the terminal 100 and the base station 200 from the base station 200, separately from the beam measurement period included in the resource allocation information for beam measurement, to determine that the distance between the terminal 100 and the base station 200 is less than or equal to the preset distance.

When the distance between the terminal 100 and the base station 200 is less than or equal to the preset distance, the terminal 100 can enter step S570 and transmit a resource allocation information request signal for additional beam measurement to the base station 200. The terminal 100 can receive resource allocation information for additional beam measurement from the base station 200. Here, the terminal 100 can receive the resource allocation information for additional beam measurement including an additional beam measurement period that is faster than the beam measurement period included in the resource allocation information for beam measurement. The terminal 100 can perform beam tracking for selecting the antenna 170, in response to the change in the beam direction corresponding to the rotation of the terminal 100, based on commencement of the additional beam measurement period included in the resource allocation information for additional beam measurement.

Figure 6:
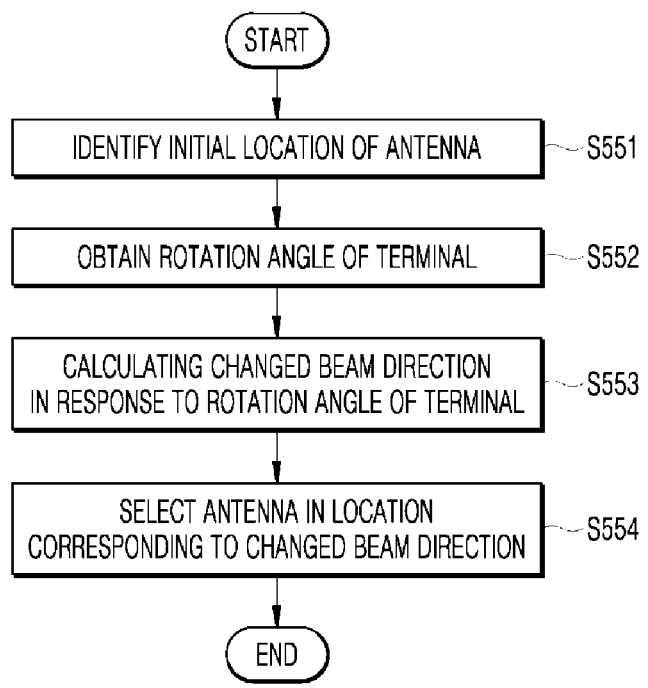
FIG. 6 is a flowchart illustrating a method for performing beam tracking illustrated in FIG. 5.

FIG. 6 is a flowchart illustrating a method for performing beam tracking illustrated in FIG. 5. In the following description, descriptions of reference numerals overlapping with those of FIGS. 1 to 5 will be omitted for convenience of description.

Referring to FIG. 6, in step S551, when the terminal 100 performs beam tracking, the terminal 100 provided with the first antenna 170a to the eighth antenna 170h can identify an initial location of one antenna 170 that forms optimal beam paring with the base station 200.

In step S552, when the rotation is sensed, the terminal 100 can obtain a rotation angle of the terminal 100.

In step S553, the terminal 100 can calculate a changed beam direction in response to the rotation angle.

In step S554, the terminal 100 can select the antenna 170 in a location corresponding to the changed beam direction. Here, the terminal 100 and the base station 200 can be in a state of maintaining beam pairing.

In an optional embodiment, when a change of the beam measurement period included in the resource allocation information for beam measurement is identified, the terminal 100 can perform beam tracking.

Embodiments according to the present disclosure described above can be implemented in the form of computer programs that can be executed through various components on a computer, and such computer programs can be recorded in a computer-readable medium. Examples of the computer-readable medium can include, but are not limited to: magnetic media such as hard disks, floppy disks, and magnetic tapes; optical media such as CD-ROM disks and DVD-ROM disks; magneto-optical media such as floptical disks; and hardware devices that are specially configured to store and execute program commands, such as ROM, RAM, and flash memory devices.

Meanwhile, the computer programs can be those specially designed and constructed for the purposes of the present disclosure or they can be of the kind well known and available to those skilled in the computer software arts. Examples of program code include both machine codes, such as produced by a compiler, and higher level code that can be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure can be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the embodiments described above or by the use of such terms unless limited by the appended claims. Also, it should be apparent to those skilled in the art that various modifications, combinations, and alternations can be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for selecting an antenna for beam measurement, the method comprising:
    transmitting, by a terminal, a report to a base station, the report indicating that an antenna selection function for beam measurement is provided;
    receiving, by the terminal, resource allocation information for beam measurement corresponding to the report from the base station; and
    performing, by the terminal, in response to a change in a beam direction caused by rotation of the terminal, beam tracking for selecting a second antenna of the terminal among a plurality of antennas of the terminal being in a second location corresponding to the changed beam direction, where the beam direction is changed from a first antenna among the plurality of antennas provided in a first location, so as to maintain optimal beam pairing among a first plurality of beams formed by the base station and a second plurality of beams formed by the plurality of antennas of the terminal, based on commencement of a beam measurement period included in the resource allocation information for beam measurement.

2. The method according to claim 1, herein the receiving the resource allocation information for beam measurement comprises:
    extracting beam measurement scheduling information from the resource allocation information for beam measurement corresponding to the report; and
    extracting the beam measurement period included in the beam measurement scheduling information,
    wherein the beam measurement period is slower than a beam measurement period included in resource allocation information for beam measurement received by another terminal that has not transmitted the report.

3. The method according to claim 1, wherein the performing the beam tracking comprises:
    identifying an initial location of the first antenna that forms optimal beam pairing with the base station;
    obtaining a rotation angle of the terminal calculated by using a result of sensing a rotation degree of the terminal;
    calculating the changed beam direction in response to the rotation angle of the terminal; and
    selecting the second antenna in the location corresponding to the changed beam direction.

4. The method according to claim 3, wherein the performing the beam tracking further comprises:
    performing the beam tracking based on identification of a change of the beam measurement period included in the resource allocation information for beam measurement.

5. The method according to claim 1, further comprising:
    sensing a speed of the terminal separately from the beam measurement period included in the resource allocation information for beam measurement;
    transmitting a resource allocation information request signal for an additional beam measurement, to the base station, based on the speed of the terminal that is greater than or equal to a preset speed; and
    receiving the resource allocation information for the additional beam measurement from the base station.

6. The method according to claim 5, wherein the receiving the resource allocation information for the additional beam measurement comprises:
    receiving an additional beam measurement period that is faster than the beam measurement period included in the resource allocation information for beam measurement.

7. The method according to claim 5, further comprising:
    performing beam tracking for selecting the second antenna, in response to the change in the beam direction corresponding to the rotation of the terminal, based on commencement of an additional beam measurement period included in the resource allocation information for the additional beam measurement.

8. The method according to claim 1, further comprising:
    receiving, from the base station, a measurement result that a distance between the terminal and the base station is less than or equal to a preset distance, separately from the beam measurement period included in the resource allocation information for beam measurement;
    transmitting a resource allocation information request signal for an additional beam measurement to the base station; and
    receiving the resource allocation information for the additional beam measurement from the base station.

9. The method according to claim 8, wherein the receiving the resource allocation information for the additional beam measurement comprises:
    receiving an additional beam measurement period that is faster than the beam measurement period included in the resource allocation information for beam measurement.

10. The method according to claim 8, further comprising:
    performing beam tracking for selecting the second antenna, in response to the change in the beam direction corresponding to the rotation of the terminal, based on commencement of an additional beam measurement period included in the resource allocation information for the additional beam measurement.

11. An apparatus for selecting an antenna for beam measurement, the apparatus comprising:
    a plurality of antennas; and
    a communication processor configured to control communication with a base station,
    wherein the communication processor is configured to:
    transmit, to the base station, a report indicating that an antenna selection function for beam measurement is provided,
    receive resource allocation information for beam measurement corresponding to the report from the base station, and
    perform, in response to a change in a beam direction caused by rotation of the apparatus, beam tracking for selecting a second antenna of the apparatus among a plurality of antennas of the apparatus being in second location corresponding to the changed beam direction, where the beam direction is changed from a first antenna among the plurality of antennas of the apparatus provided in a first location, so as to maintain optimal beam pairing among a first plurality of beams formed by the base station and a second plurality of beams formed by the plurality of antennas of the apparatus, based on commencement of a beam measurement period included in the resource allocation information for beam measurement.

12. The apparatus according to claim 11, wherein the communication processor is configured to:
   extract beam measurement scheduling information from the resource allocation information for beam measurement corresponding to the report, and
   extract the beam measurement period included in the beam measurement scheduling information,
   wherein the beam measurement period is slower than a beam measurement period included in resource allocation information for beam measurement received by another terminal that has not transmitted the report.

13. The apparatus according to claim 11, further comprising:
   a position sensor configured to sense a rotation degree of the apparatus; and
   a module control processor configured to calculate a rotation angle of the apparatus using the rotation degree of the apparatus,
   wherein the communication processor is configured to:
   identify an initial location of the first antenna that forms optimal beam pairing with the base station,
   obtain the rotation angle of the apparatus from the module control processor,
   calculate the changed beam direction in response to the rotation angle of the apparatus, and
   select the second antenna in the location corresponding to the changed beam direction.

14. The apparatus according to claim 13, wherein the communication processor is further configured to perform the beam tracking based on identification of a change of the beam measurement period included in the resource allocation information for beam measurement.

15. The apparatus according to claim 11, further comprising:
   a speed sensor configured to sense a speed of the apparatus,
   wherein the communication processor is configured to:
   obtain the speed of the apparatus from the speed sensor separately from the beam measurement period included in the resource allocation information for beam measurement,
   transmit a resource allocation information request signal for an additional beam measurement, to the base station, based on the speed of the apparatus that is greater than or equal to a preset speed, and
   receive the resource allocation information for the additional beam measurement from the base station.

16. The apparatus according to claim 15, wherein the communication processor is further configured to receive the resource allocation information for the additional beam measurement including an additional beam measurement period that is faster than the beam measurement period included in the resource allocation information for beam measurement.

17. The apparatus according to claim 15, wherein the communication processor is further configured to perform beam tracking for selecting the second antenna, in response to the change in the beam direction corresponding to the rotation of the apparatus, based on commencement of an additional beam measurement period included in the resource allocation information for the additional beam measurement.

18. The apparatus according to claim 11, wherein the communication processor is further configured to:
   receive, from the base station, a measurement result that a distance between the apparatus and the base station is less than or equal to a preset distance, separately from the beam measurement period included in the resource allocation information fir beam measurement,
   transmit a resource allocation information request signal for an additional beam measurement to the base station, and
   receive the resource allocation information for the additional beam measurement from the base station.

19. The apparatus according to claim 18, wherein the communication processor is further configured to receive the resource allocation information for the additional beam measurement including an additional beam measurement period that is faster than the beam measurement period included in the resource allocation information for beam measurement.

20. The apparatus according to claim 18, wherein the communication processor is further configured to perform beam tracking for selecting the second antenna, in response to the change in the beam direction corresponding to the rotation of the apparatus, based on commencement of an additional beam measurement period included in the resource allocation information for the additional beam measurement.

* * * * *